United States Patent [19]

Senator

[11] Patent Number: 5,765,151
[45] Date of Patent: Jun. 9, 1998

[54] SYSTEM AND METHOD FOR FILE SYSTEM FIX-ON-PANIC FOR A COMPUTER OPERATING SYSTEM

[75] Inventor: Steven T. Senator, Colorado Springs, Colo.

[73] Assignee: Sun Microsystems, Inc., Palo Alto, Calif.

[21] Appl. No.: 516,429

[22] Filed: Aug. 17, 1995

[51] Int. Cl.$^6$ .................................................. G06F 17/30
[52] U.S. Cl. ...................... 707/8; 395/726; 395/676; 395/180; 395/182.13; 707/202
[58] Field of Search ........................ 395/182.13, 200, 395/600, 618, 726, 676; 707/202, 8

[56] References Cited

U.S. PATENT DOCUMENTS

| | | | |
|---|---|---|---|
| 4,993,030 | 2/1991 | Krakauer et al. | 364/243 |
| 5,175,852 | 12/1992 | Johnson et al. | 395/600 |
| 5,202,971 | 4/1993 | Henson et al. | 395/425 |
| 5,218,695 | 6/1993 | David et al. | 395/621 |
| 5,226,159 | 7/1993 | Henson et al. | 395/650 |
| 5,392,433 | 2/1995 | Hammersley et al. | 395/725 |
| 5,485,579 | 1/1996 | Hitz et al. | 395/200.12 |
| 5,497,492 | 3/1996 | Zbikowski et al. | 395/700 |
| 5,504,883 | 4/1996 | Hamet et al. | 395/618 |
| 5,519,853 | 5/1996 | Moran et al. | 395/550 |
| 5,537,645 | 7/1996 | Henson et al. | 395/650 |
| 5,553,285 | 9/1996 | Krakauer et al. | 395/600 |
| 5,572,711 | 11/1996 | Hirsch et al. | 395/500 |
| 5,642,501 | 6/1997 | Doshi et al. | 395/608 |

OTHER PUBLICATIONS

Kent Peacock File System Multithreading in System V Release 4 MP, Jun. 1992.
Sun "Administration Guide for X86" Jun. 1993.
Digital "System Administration" Aug. 1994.
Liskov et al. "A replicated Unix File System" IEEE, pp. 11–14, Mar. 1990.
Mohindra et al. "Distributed Token Management in calypso file system" IEEE, pp. 290–297, Apr. 1994.
Puneet Kumar "Coping with conflicts in an optimistically replicated file system" IEEE, pp. 60–64, Mar. 1990.
Sloan et al. "The mass storage system IV enterprise" IEEE, pp. 621–630, Apr. 1993.
Liskov et al. "Efficient Recovery in harp" IEEE, pp. 104–106, Apr. 1992.
Sloan et al. "The MaSSIVE(TM) Project at NCAR" IEEE, pp. 119–125, Mar. 1993.
"DEC OSF/1 System Administration," Digital Equipment Corp., Maynard, Massachusetts, Ch. 7.3 Checking File Systems, pp. 7–14 to 7–15; Ch. 8.1 Features and Benefits, pp. 8–3 to 8–5, Aug. 1994.
"Sun OS 5.1 Routine System Administration Guide for x86, Revision A," Sun Microsystems, Inc., Mountain View, California, Ch. 14, Checking the Integrity of File Systems, pp. 280,310, Jun. 1993.
Srinivansan, B., et al., "Recoverable File System for Microprocessor Systems," Microprocessors and Microsystems, vol. 9, No. 4, May 1985, London, UK, pp. 179–183.
Peacock, J.K., "File System Multithreading in System V Release 4 MP," Proceedings of the Summer 1992 Usenix Conference, Jun. 8–12, 1992, San Antonio, Texas, pp. 19–29.

*Primary Examiner*—Thomas G. Black
*Assistant Examiner*—Jean M. Corrielus
*Attorney, Agent, or Firm*—William J. Kubida; Stuart T. Langley; Holland & Hart LLP

[57] ABSTRACT

A system and method for file system fix-on-panic for a computer operating system which comprises an enhancement to the UNIX® File System ("UFS") that increases total system availability by detecting file system errors and determining whether on-line repair is possible and then locking, repairing and unlocking the failed file system. Availability of the entire computer system is increased since the mean time to failure for independent threads is increased by the amount of time up to the next failure and the mean time to repair for dependent threads is reduced to only the amount of time necessary for the repair. The system and method disclosed allows for repairs to be made during use, may be called from the user level and allows for blocking of only particular threads.

18 Claims, 5 Drawing Sheets

SYSTEM AND METHOD FOR FILE SYSTEM FIX-ON-PANIC FOR A COMPUTER OPERATING SYSTEM

BACKGROUND OF THE INVENTION

The present invention relates, in general, to the field of file systems ("FS") of computer operating systems ("OS"). More particularly, the present invention relates to a system and method for selectably implementing and removing an "error lock" for file system "fix-on-panic" which is of particular utility with respect to computer operating systems incorporating a UNIX® System V File System ("VFS", also known as the "VFSop" or "Vnode") layer or similar OS file system interfaces.

File systems may be defined as groupings of files used to store named objects on persistent computer mass storage media. As such, files systems maintain a set of in-memory and on-disk data structures which must all be consistent with each other for proper functioning of the file system. UNIX operating systems, for example, resort to an enforced total system shutdown (a "panic") when these data structures are not consistent. This "panic" then renders the whole system unavailable for the duration of the time necessary to shut down the computer system, repair all on-disk inconsistencies and resume normal system operation.

Through the addition of the lock FS or ("lockfs") functionality to UNIX, the ability to lock a whole file system was presented which could be then implemented generically for any file system. This feature provides the ability to block selected operations according to differing kinds of locks. For example, a file system may be rendered temporarily and selectively unmodifiable (e.g. wherein a file may be precluded from being removed) with no other operation to it being blocked. A "blocked" operation is one that merely waits until the file system is again unlocked. In this connection, a "delete lock" or "name lock" is a type of lock wherein the file system may still be able to be changed, but only in certain predefined manners. Attempted access to a locked file system results in a perceived delay until the particular file system becomes unlocked.

Alternatively, a "hard lock" is one in which a particular file system is simply precluded from further access. A hard lock may be invoked, for example, when a storage media defect is detected and a data recovery action must then be implemented. Hard locks do not remove the file system from the name space but access to anything within it fails with an error and the only way to clear a hard lock is to unmount the file system. Significantly, if any file system on a given computer has a consistency problem, the computer then "goes down" and all of the services it provides then become unavailable for all users. This is a particularly acute and costly situation with existing client-server computer systems when it is the server computer that happens to be the one on the network to encounter a consistency problem.

In an attempt to avoid system down-time, it has previously been proposed to embed checking algorithms into the file system itself. Exemplary of this technique is the VXFS software from Veritas in which the checking is done in core utilizing a two phase commit protocol and the IBM journalled file system ("JFS") built upon a database-like model. In either case, the additional central processor unit ("CPU") "overhead" added to the file system to implement the checking function results in an overall slower system operation. Still another checking approach implemented by Auspex utilizes an algorithm running on a CPU dedicated solely to providing file system operations. As a consequence, the resultant system is unique to the particular hardware implementation for which it was designed and, therefore, has limited applicability to other architectures.

SUMMARY OF THE INVENTION

The system and method of the present invention provides an alternative file system locking mechanism to the existing "write" and "hard" locks which may be conveniently denominated an "error lock" which is used to implement file system "fix-on-panic". As disclosed herein, an error lock (like a hard lock) locks everything but may still be unlocked (like a write lock), after the file system has been made consistent. Utilizing the system and method of the present invention, should a particular file system encounter an error, only those specific dependent users who are using that file system service will be impacted, thereby greatly increasing overall system availability to independent users.

The file system fix-on-panic system and method of the present invention is of especial utility as an enhancement to the UNIX file system ("UFS") and serves to increase total computer system availability by detecting file system errors, determining whether on-line repair is possible and then locking, repairing and unlocking the failed file system. The system and method herein disclosed may also be advantageously implemented on any operating system incorporating a VFS layer or its equivalent, any System V-based UNIX system, IBM's AIX or MicroSoft's NT operating system.

The system and method of the present invention has been devised as an adjunct to existing lock mechanisms to provide an approach to on-line file system checking which is implemented on a monolithic kernel and may be run on multiple processors. It allows for file system fixing while in use, may be called out from the user level and also allows for modifications to be made to the UFS lock file system ("lockfs") layer to block only particular threads while being non-intrusive with respect to general file system data structures and algorithms.

In a particular implementation of a method, and a computer program product for implementing the method, for selectably error locking a failed file system of a computer operating system as disclosed herein, the method comprises the steps of providing for detecting an error in a failed file system of the computer operating system and determining if on-line repair of the failed file system is possible. The method further comprises the steps of providing for locking the failed file system if on-line repair is possible, effectuating the on-line repair of the failed file system and unlocking the failed file system. In a more specific implementation, the step of providing for detecting is carried out by the steps of providing for noting an inconsistency in the failed file system, creating a failure record corresponding to the failed file system inconsistency and placing the failure record on an operating system lock thread.

Also disclosed is a computer including a computer operating system loadable thereon for running application programs, with the operating system having a plurality of file systems incorporated therein accessable from the application programs. The operating system comprises a failed thread for indicating an error in a failed one of the plurality of file systems and a lock thread started in response to the failed thread. An error lock is responsive to the lock thread for selectably locking the failed file system if on-line repair thereof is possible. A block is responsive to the error lock for inhibiting other threads from accessing the failed one of the plurality of file systems while on-line repair thereof is being effectuated whereby the block is then removed in response to completion of the on-line repair of the failed file system.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
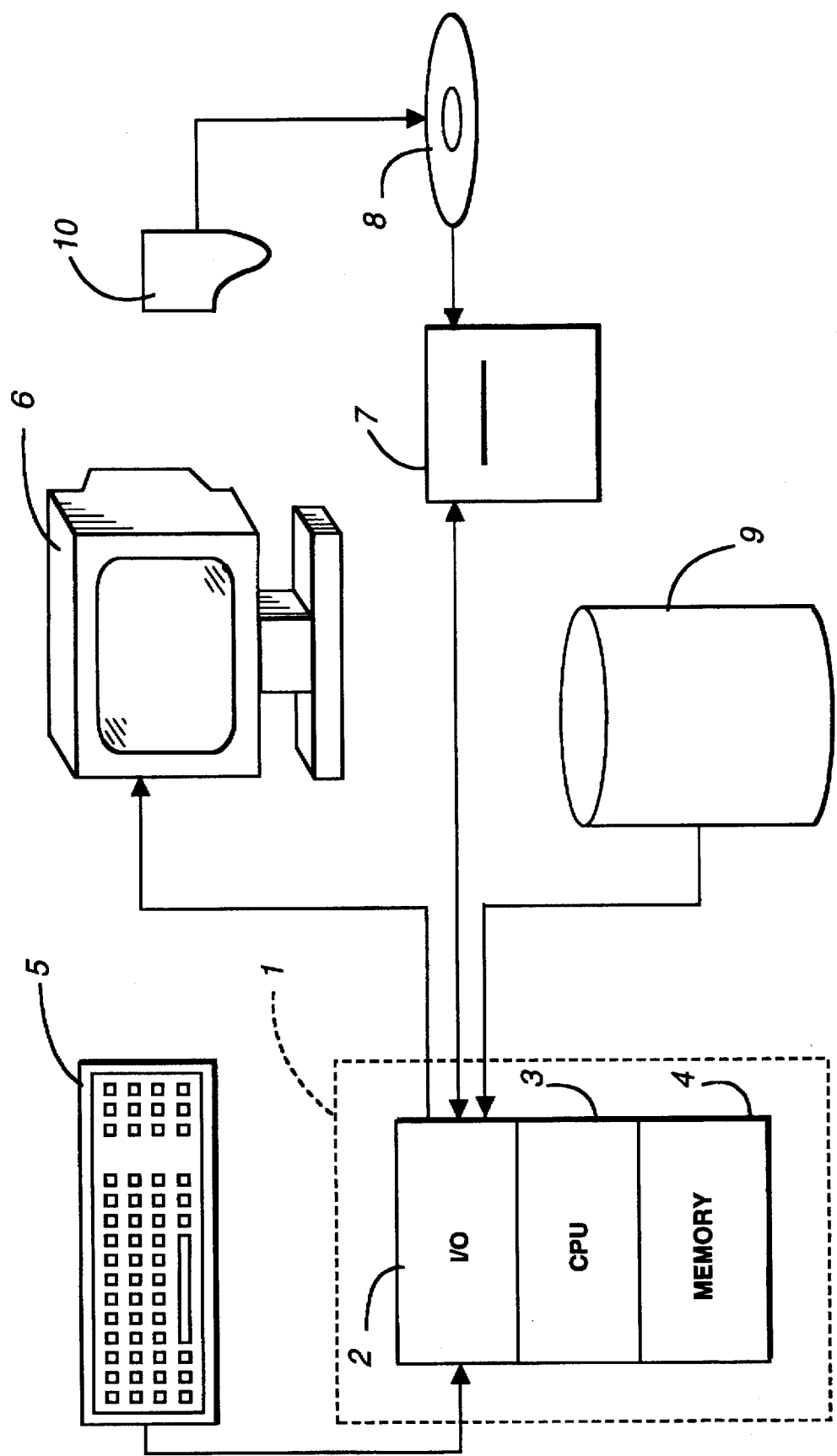
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 10 and data. The computer program products containing mechanisms to effectuate the apparatus and methods of the present invention may reside in the memory section 4, or on a disk storage unit 9 or on the CDROM 8 of such a system.

Figure 2:
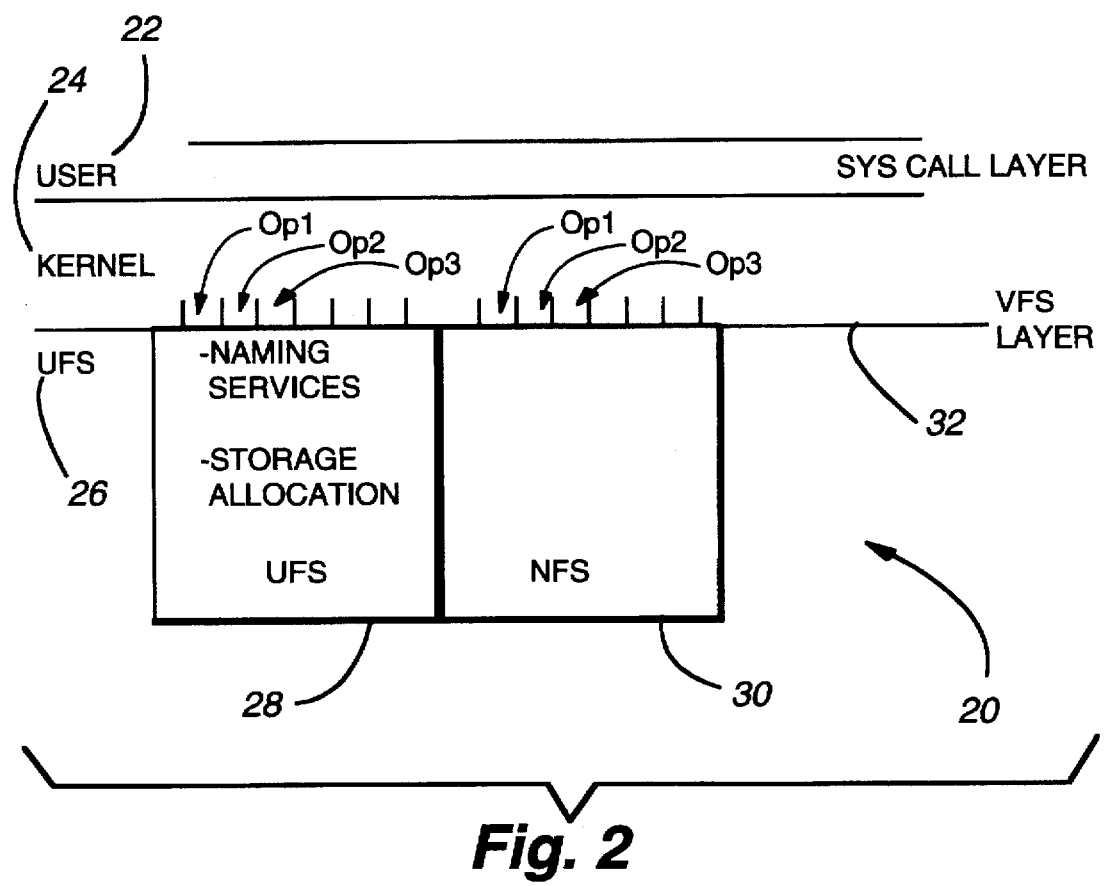
FIG. 2 is a simplified conceptual illustration of the pertinent UNIX operating system layers underlying a software application running on a computer system made up of one or more of the computers of FIG. 1 and illustrating with particularity the "User", "Kernel" and "UFS" layers with the VFS interface between the latter two on which various operations (e.g. Op1–Op3) may be run.

With reference now to FIG. 2, a simplified conceptual illustration of the pertinent UNIX operating system layers 20 underlying an application program running on a computer system comprising a network of one or more of the computers depicted in FIG. 1 is shown. Particularity illustrated are the "User" (or system call) layer 22, the "Kernel" 24 and the "UFS" layer 26. Within the Kernal 24, there exists the UFS module 28 and, in some instances, a network file system ("NFS") module 30. The UFS module 28 may include, for example, file naming, storage allocation and other services. As shown, a number of operations (Op1, Op2, Op3 and the like) may occur on the UFS module 28 and NFS module 30 at the VFS layer 32. The VFS layer 32 (also known as the VFSop or Vnode layer) is the interface between the Kernal 24 and UFS layer 26 on which various operations may be run.

Figure 3:
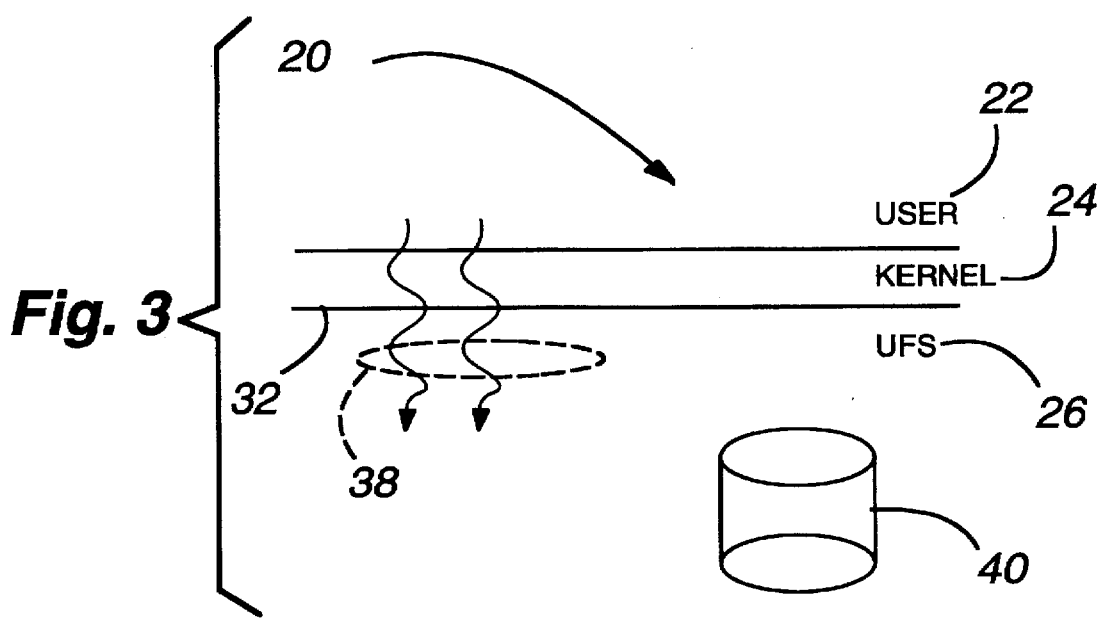
FIG. 3 is a simplified conceptual representation of how internal data structures change during normal operations preceding a UFS failure.

With reference now to FIG. 3, the system layers 20, comprising the user layer 22, Kernal 24 and UFS layer 26, are shown, including the VFS layer 32, as previously depicted in FIG. 2. In addition, a storage device 40 is shown along with a number of UFS threads 38. The UFS threads 38 may be conveniently thought of as a running program or independent "things" which can execute program code. (This is in contrast to a "process" which is an independent thing which can have multiple threads).

In normal operation as depicted, the UFS threads 38 pass from the user layer 22, Kernal 24 and through the VFS layer 32 to the UFS layer 26 in response to the running of an application program which requests a particular file system operation.

Figure 4:
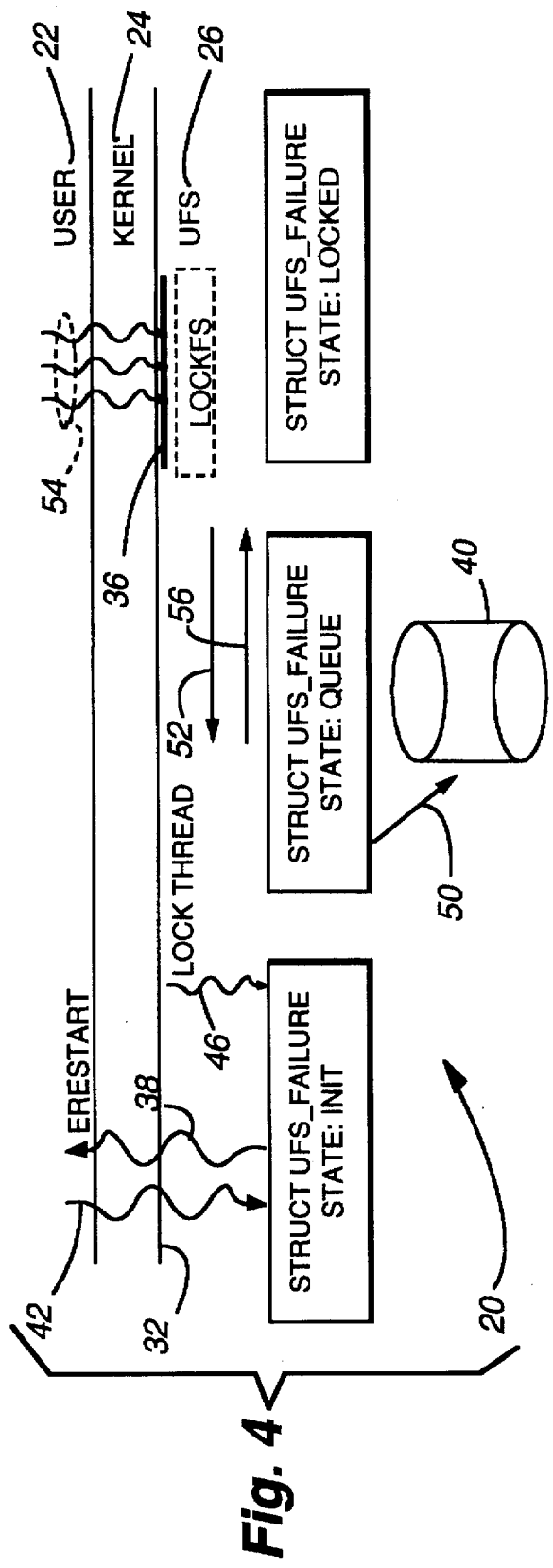
FIG. 4 is a follow-on, simplified conceptual representation of a UFS failure having been recognized and resulting in the blocking of other UFS threads at the VFS layer.

With reference additionally now to FIG. 4, the system layers 20 and storage device 40 of the preceding figure are shown upon the occurrence of a file system failure. In this connection, the following definitions shall pertain:

("Authoritative System Reference" or "ASR") is a fictitious entity which produces a correct behavior of the system.

("Error") is a difference between the actual system behavior and that produced by an ASR.

("Fault") is a source which has the potential of generating errors.

("Failure") is a manifestation of a fault.

("UFS Failure") is an instance of UFS deviating from its specified behavior. In certain implementations, UFS failures may be either "synchronous failures" (those for which the program code explicitly checks), or "asynchronous failures" (those which are handled by the trap handling mechanism). The problems presented by the latter type of UFS failure are not applicable to the system and method disclosed herein.

Within a particular implementation of the Solaris® operating system developed and licensed by Sun Microsystems, Inc., assignee of the present invention, two types of synchronous failures may be encountered:

("Assertions" or "Asserts") are conditional expressions which are only checked in pre-production software. When true, the system is forcibly shutdown.

("Panics") are conditional expressions which are always checked. They are "permanent assertions" and the word "panic" is often used as a noun to mean "a forced system shutdown" and as a verb to mean "to force the system to shutdown".

("Failing Thread") is the thread in whose context the UFS failure manifests. Dependent (and independent) threads may be defined as threads which do (or do not) depend upon the resources of the failing file system, respectively.

("Availability") is the expected fraction of time that the system is able to provide service within acceptable response times. It is used to describe systems in which service may be delayed or denied for short periods without serious consequences. Quantitatively it can be defined as follows:

$$\text{Availability} = \frac{\text{MeanTimeToFail}}{\text{MeanTimeToFail} + \text{MeanTimeToRepair}}$$

or alternatively:

$$\text{Availabilty} = \frac{1}{\left(1 + \frac{\text{MeanTimeToRepair}}{\text{MeanTimeToFail}}\right)}$$

The system and method of the present invention assumes a division of users of a system into those who are not dependent and those who are dependent upon a failed file system and reduces the granularity of availability from that of the whole system to that of a file system service.

TABLE 1

System Call Failure Semantics: local and remote threads

| thread | system call failure semantic |
| --- | --- |
| local + remote: failing, dependent | returns error (ERESTART) |
| local: dependent | block until unlock or unmount |
| remote: dependent | returns error (EWOULDBLOCK) |
| local + remote: independent | no failure; no delay |

In a conventional UFS implementation, a great deal of state is maintained in-core. However, not all of this state is managed by UFS itself. A UFS failure indicates that at least some of this in-core state is untrustworthy. To recover from this, the following actions are necessary:

(1) The failed file system must be quiesced;

(2) Bad in-core state must be discarded;

(3) The on-disk state must be verified to be consistent, at least, and (probably) repaired;

(4) In-core state must be re-initialized from consistent values; and (5) Operations that were "frozen" at file system quiesce must be allowed to proceed.

In the UNIX operating system in particular, this problem is addressed by the panic( ) mechanism and all in-core state is discarded. Repair and re-initialization happen at reboot time. Network file system operations, by the nature of the protocol, are frozen until the necessary daemons are restarted. Local operations, having been discarded, are lost. Lockfs performs all of the above functions, except for repair, which is done by fsck. UFS failures can be encountered at many different logical levels within UFS. As such, there is no guarantee as to what resources or resource locks are held at the time of the failure. This is true for UFS resources and locks as well as other subsystems on which UFS depends, such as VM. The traditional panic( ) routine addresses this problem by explicit code in the lock granting algorithm. When panicking, lock requests are always granted; other non-panicking threads are prevented from running.

Lockfs is invoked from an ioctl( ) system call. It, therefore, behaves much more hierarchically with respect to resources and locks. However, putting special-case code into UFS lockfs and all of the other routines possible to be invoked by it would require the introduction of additional mechanisms and intrude upon general UFS data structures and algorithms.

The UFS implementation contains redundant information within the allocation bitmaps and summary structures. An effect of this is that failures tend to occur much later in time than when the actual error occured. Consequently, there is a many-to-one relationship between an error and a failure condition ("the panic string"). Therefore, the proposed mechanism discards all structures detected as bad and re-initializes them to consistent values. As a consequence, it is always as good as the current panic-and-reboot mechanism in addressing the failure.

It would not be appropriate to attempt repair when the effects of the failure are too severe or when the error itself is able to be solved. These effects may be expressed as either the MTTF or MTTR is unacceptably high. Stated another way, the failure is occurring too often or failure causes too much damage, respectively. This is controllable by a set of new tunable variables. If the error is reproducible, then it is correct to fix the bug, rather than to use the file system fix-on-panic of the present invention to mask the error. The utility of the system and method herein disclosed is to address those errors that happen intermittently and are not yet reproducible.

In the general case, attempts to repair a UFS file system should be made. However, some specific UFS file systems have additional constraints imposed upon them. The root ("/") and user ("/usr") file systems are necessary to invoke fsck. As a consequence, locking them would cause a deadlock condition. UFS file systems on which active kernel accounting files reside or to which swapping may occur may also create similar deadlock conditions. Therefore, on these specific file systems, a panic is invoked.

Inodes whose generation number has changed are recognized by lockfs reconciliation algorithms. The old inode is modified to make it appear to reference a file on a file system that has been forcibly unmounted. No new inode modes or algorithms are necessary. If the quota inode (the inode associated with the file system's quota file) is removed, quota enforcement is disabled on this file system (in a manner similar to closedq( ) ) and a warning message is logged. Note that this will never be the case for a "fsck -p" and manual repair is necessary in order to cause an inode to be removed. Files which have been unlinked but are still being referenced are detectable and will not be removed. Fsck's output will be captured by the logger command and sent to the syslog file.

As shown in the representative example of FIG. 4, in the event of a file system failure, a failed thread 42 will pass through the user layer 22, kernal 24 and into the UFS layer 26. Upon detection of the failed thread 42, a UFS failure record is created as indicated at reference numeral 44 and placed on the lock thread 46 work queue. The lock thread 46 is started when a failure occurs and it functions, as will be described hereinafter, to mark the blocks on the storage device 40 which are to be threreafter inaccessible and to cause that file system to become locked.

As indicated at reference numeral 48, the failed thread 42 then returns with an error. In response, the failed file system's superblock's fs_clean flag is marked as bad at reference numeral 50 at the storage device 40 and an error lock 36 is placed on the offending file system as indicated by reference number 52. The error lock 36 serves to block other UFS threads 54 at the VFS layer 32 as indicated. At reference numeral 56, the UFS failure transitions to the state "LOCKED" when lockfs returns.

When a file system inconsistency is detected, the previously described process is invoked. However, the inconsistency may not have happened at that instant and not enough information is available at that point to indicate when it occurred, thus necessitating an application checker. With respect to lockfs, all of the Kernal 24 state (or "bookkeeping" related to storage blocks and file names for example) for a given file system is discarded except for a stub. The process of "unlocking" triggers a lock disk function called reconciliation and that retrieves the current state from the storage device 40 and, in fact, it only retrieves the current state from the storage device 40 for all the stubs that were left behind that were for things that were previously in use. Therefore, if a file changed, the state of the file on the storage device 40 would be assumed to be accurate. If the file was somehow removed, an error would be detected later but it will just be an application error and the file could simply be rewritten. The reconciliation enabled by lockfs allows this checking.

In this context, FIG. 4 conceptually illustrates internal data structure, however the process that actually identifies that there is problem provides an error code ("erestart") at reference numeral 48. This error code means that, in some cases applications, a check will be made for that specific error code and the same operation attempted again transparently to the user. Nevertheless, not all operations can be redone. For example, in attempting to create a file, in some cases it would be very hard to create a file depending upon how the file system has been damaged.

Figure 5:
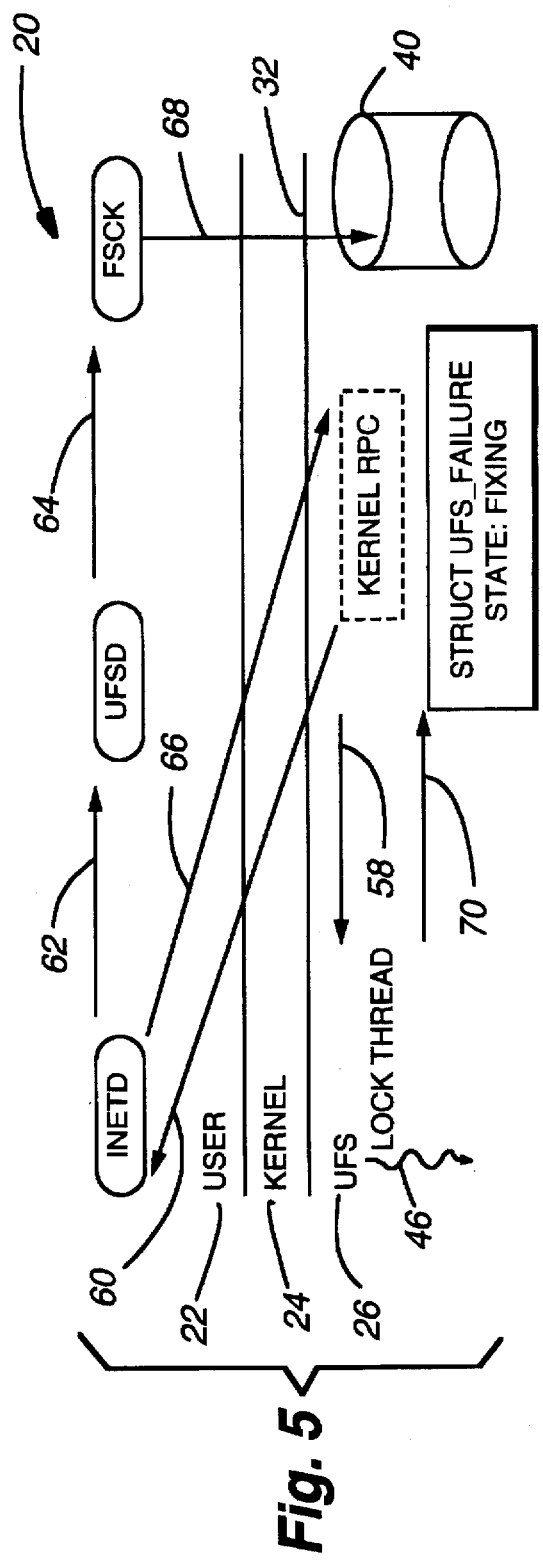
FIG. 5 is a further follow-on, simplified conceptual representation of the system and method of the file system fix-on-panic wherein the system may be unmounted or left in a locked condition and the lock thread proceeds to initiate repair to run the file system's checker.

With reference additionally now to FIG. 5 the system layers 20 of FIG. 4 are shown in conjunction with the lock thread 46 and an RPC is created as indicated by reference numeral 58 to start the repair process. At reference numeral 60, inetd is notified of the RPC creation and a UFS daemon is started as shown at reference numeral 62. In response, a fsck process is started at reference numeral 64. In the mean time, inetd has returned as indicated at reference numeral 66 since the RPC was asynchronous. At reference numeral 68, fsck marks the superblock on the storage device 40 as fixed and the UFS failure record transitions to the state "FIXING" at reference numeral 70

As previously described, the lock thread 46 initiates the repair process. It calls out of the kernel 24 and makes the file system consistency checker run and then checks to make sure that it actually starts. In other words, if a file system is error locked, there are certain keys left behind on the storage device 40 as has been previously described for lockfs. It is part of the job of the lock thread 46 to never let the computer deadlock. So, if nothing has transpired within a predetermined period of time, the computer is shut down because that will cause errors to occur and be recognized such that a system administrator can give it attention rather than just appearing to be a delay in service. By calling out the consistency checker, the system goes ahead and repairs the file system.

Figure 6:
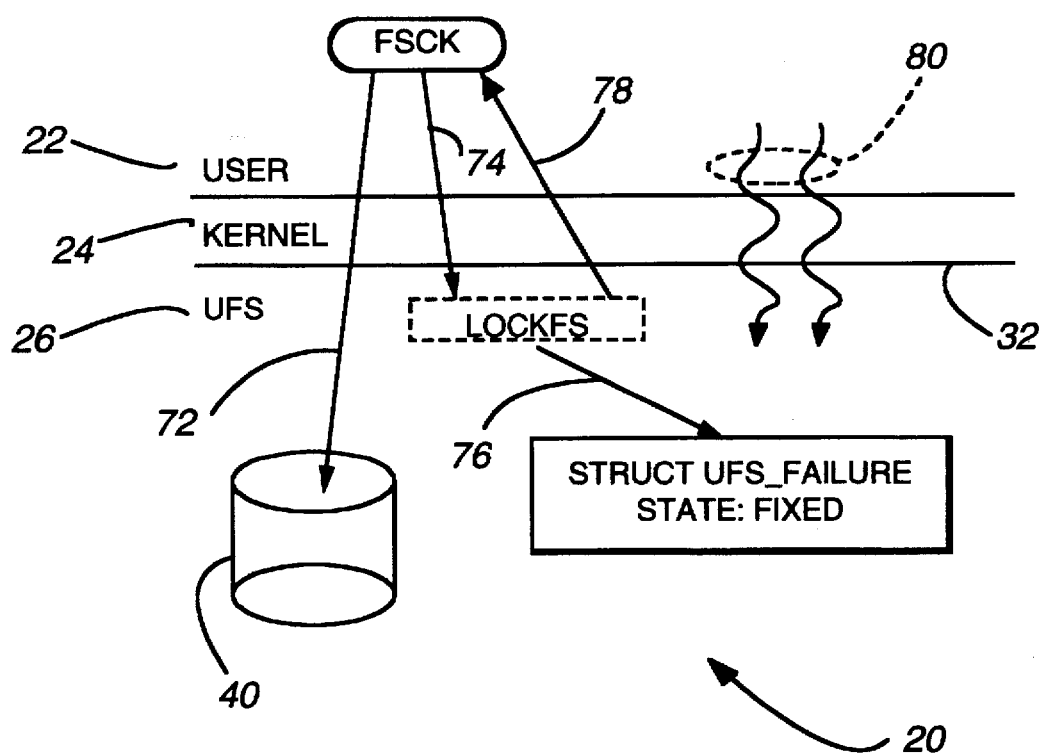
FIG. 6 is an additional follow-on, simplified conceptual representation of the layers illustrated in the preceding figures wherein file system check ("fsck") completes the repair and the other threads are allowed to continue operations.

With reference additionally now to FIG. 6, at reference numeral 72, fsck completes the file system repair, marking the file system as "clean" on the storage device 40. Fsck then also issues an "unlock" to the lockfs ioctl at reference numeral 74. In response, the lockfs sub-module calls into a fix-on-panic routine to mark the UFS failure record as "FIXED" at reference numeral 76. Lockfs returns at reference numeral 78 and other threads 80 are allowed to continue into the UFS layer 26 by removal of the error lock 36 (FIG. 4).

Figure 7:
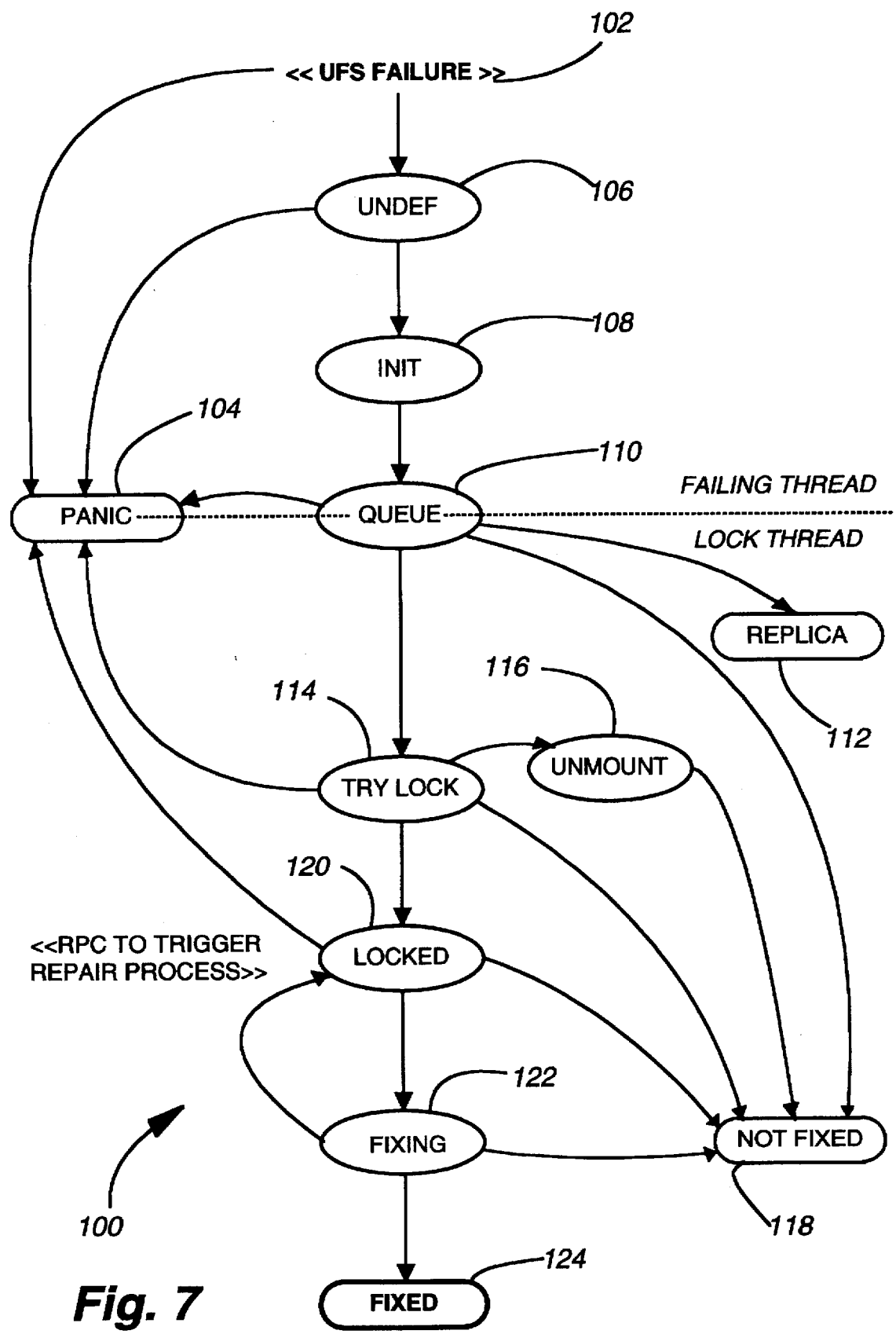
FIG. 7 is a representative state diagram illustrating possible transitions between states in the event of a UFS failure in accordance with a particular implementation of the system and method for file system fix-on-panic herein disclosed.

With reference now to FIG. 7, a state diagram illustrating possible transitions 100 between states in the event of a UFS failure in accordance with a particular implementation of the system and method of the present invention as previously described with respect to FIGS. 3–6 is shown.

At event 102, a UFS failure has been detected. Struct ufs_failure (or typedef uf _t) records are associated with each UFS failure. When a file system has failed, there is a pointer from the ufsvfsp to the current struct ufs_failure. These are put on a queue described by a struct uf s_queue and used by a UFS thread. This thread will only exist while there is a non-terminal uf s_failure on the queue. There is a one-to-one correspondence between a UFS thread and its associated queue. Each failure has an associated state.

Terminal state 104, ("PANIC") implies that either the file system was not allowed to be repaired, unable to be locked or UFS Fix-On-Panic algorithms encountered an internal error. It is a terminal state, for the whole system.

State 106 ("UNDEF") means that these records are freshly allocated and have not yet been initialized. Their existence implies that a failure has occurred. These are allocated in the context of the failing thread.

State 108 ("INIT") means that these records have been initialized. Their existence implies that this file system is allowed to be locked and may be fixable. These are initialized in the context of the failing thread. The following UFS control structures and pointers are copied into the struct ufs_failure

```
struct buf*uf_bp;         /* ptr to buf containing superblock */
                          /* used to update the superblock state */
kmutex_t *uf_vfs_lockp;   /* used to examine/modify the ufsvfsp */
struct vfs_ufs *uf_vfs_vufp;/* used to determine if this is */
                          /* a replica or original failure */
                          /* of a given fs; also to prevent */
                          /* too frequent failures per fs */
struct vfs *uf_vfsp;      /* used to get to structures needed to */
                          /* invoke lockfs and to get to fs name */
struct ufsvfs *uf_ufsvfsp;/* used to get to structures needed */
                          /* to invoke lockfs and to determine */
                          /* if fs is unmounted/remounted while */
                          /* there's an associated ufs_failure */
                          /* in a non-terminal state */
char uf_fsname[MAXMNTLEN];/* copied from superblock; used to */
                          /* generate error message if fs unmounted */
char uf_panic_str[LOGKFS_MAXCOINENTLEN];
                          /* used to print original panic message */
                          /* including arg. values if devolve to */
                          /* a panic */
```

State 110 ("QUEUE") means these records have been put onto the work queue for the lock thread. In some cases, due to lock contention, records will be put on the work queue but unable to be marked in this state. In this case, the lock thread will update the failure record's state. Usually, this state transition will occur in the context of the failing thread.

Terminal state 112 ("REPLICA") implies that a UFS failure has occurred on a file system which has already failed. The lock thread is responsible for moving a record from the QUEUE state 110 into this state, since manipulation of the ufsvfs is required. Once recorded, these records are ignored, as repair is already initiated and associated with the original ufs_failure.

State 114 ("TRY LOCK") means that records have been found by the lock thread and updated with the information necessary to invoke the internal lockfs entry point, ufs_fiolfs( ). The ufsvfs of the failed file system is updated at this point to indicate that a failure has occurred on this file system. This is used to detect replicated UFS failures.

State 116 ("UMOUNT") implies that the file system was marked to be unmounted rather than repaired. No actions are taken once a failure record achieves this (or any other) terminal state.

Terminal state 118 ("NOT FIX") implies that this file system was marked not to be repaired or was forcibly unmounted, preventing the fix from occuring automatically.

State 120 ("LOCKED") implies that the failed file system has been succesfully locked. An RPC call is made to a port to initiate repair. The RPC call returns when fsck is succesfully started.

State 122 ("FIXING") implies that fsck has updated the superblock indicating that repair is in progress.

Terminal state 124 ("FIXED") implies that this file system has been successfully repaired and unlocked.

The following are the necessary conditions for the state transitions 100 between certain of the states above described:

From event 102 to terminal state 104 ("PANIC"): a non-UFS panic is already in progress; the file system is not identifiable (vp, ufsvfsp, vfsp are NULL); the fix-on-panic feature has been disabled on this file system; there is an active swap file contained in this file system; and there is an active kernel accounting file contained in this file system.

From state 106 ("UNDEF") to terminal state 104 ("PANIC"): the file system's control structures (ufsvfsp, vfsp, bp containing struct fs) became invalid.

From state 108 ("INIT") to state 110 ("QUEUE"): this struct ufs_failure has been put on the lock thread's work queue.

From state 110 ("QUEUE") to terminal state ("REPLICA"): this is another active UFS failure associated with this file system.

From state 110 ("QUEUE") to state 114 ("TRY LOCK"): file system control structures haven't changed since the failure was recognized.

From state 110 ("QUEUE") to terminal state 104 ("PANIC"): the per-system limit on number of UFS failures has been exceeded; and the per-system limit of minimum time between UFS failures has been exceeded.

From states 110 ("QUEUE")/ 114 ("TRY LOCK")/ 120 ("LOCKED") and 122 ("FIXING") to terminal state 118 ("NOT FIX"): this file system has been unmounted by some other thread.

From state 114 ("TRY LOCK") to terminal state 104 ("PANIC"): the timeout has been exceeded while trying to error lock the file system; lockfs failed on this file system with the error EDEADLK; there have been too many failures on this file system since boot; and this failure has occurred too soon since the last failure on this file system.

From state 114 ("TRY LOCK") to state 116 ("UMOUNT"): this file system is marked to be unmounted on failure.

From state 116 ("UMOUNT") to terminal state ("NOT FIX"): the unmount of the file system succeeded.

From state 114 ("TRY LOCK") to state 120 ("LOCKED"): the error lock of the file system succeeded; and the error lock of the file system failed, thereby indicating that it is already error-locked.

From state 120 ("LOCKED") to terminal state 104 ("PANIC"): fsck does not or cannot be started.

From state 120 ("LOCKED") to state 122 ("FIXING"): the file system's superblock's fs_clean field has been reset to FSFIX by fsck.

From state 122 ("FIXING") to state 120 ("LOCKED"): the file system's superblock's fs_clean field has been reset to FSBAD by fsck; and the repair daemon detected an error in the execution of fsck.

From state 122 ("FIXING") to terminal state 124 ("FIXED"): the error lock on the file system has been unlocked. (This requires fs_clean==FSCLEAN).

Utilizing the system and method of the present invention herein disclosed, availability of the whole system is increased since the Mean Time To Failure (MTTF) for independent threads is increased by the amount of time up to the next failure. In addition, the MTTF and the Mean Time To Repair (MTTR) for those dependent threads is reduced to just the amount of time necessary for the repair rather than for any system overhead (such as a panic dump, hardware reset, reboot or failover to another node.)

While there have been described above the principles of the present invention in conjunction with specific computer operating systems the foregoing description is made only by way of example and not as a limitation to the scope of the invention.

What is claimed is:

1. A method for selectably error locking a failed file system of a computer operating system, said method comprising the steps of:

providing for detecting an error in a failed file system of said computer operating system;

providing for determining if on-line repair of said failed file system is possible;

providing for locking said failed file system if said on-line repair is possible;

providing for effectuating said on-line repair of said failed file system; and providing for unlocking said failed file system.

2. The method of claim 1 wherein said step of providing for detecting is carried out by the steps of:

providing for noting an inconsistency in said failed file system;

providing for creating a failure record corresponding to said failed file system inconsistency; and providing for placing said failure record on an operating system lock thread.

3. The method of claim 2 wherein said inconsistency is noted in response to an operating system failed thread.

4. The method of claim 1 wherein said step of providing for locking further comprises the step of:

providing for marking blocks of data associated with said failed file system as inaccessible on an associated computer mass storage device.

5. The method of claim 1 wherein said operating system is shut down in response to said step of providing for determining if said on-line repair of said failed file system is not possible.

6. The method of claim 1 further comprising the step of:

providing for allowing other threads corresponding to other operating system file systems to continue while said failed file system is locked.

7. A computer program product comprising: a computer usable medium having computer readable code embodied therein for causing selectably error locking of a failed file system of a computer operating system, the computer program product comprising:

computer readable program code devices configured to cause a computer to effect detection of an error in a failed file system of said computer operating system;

computer readable program code devices configured to cause a computer to effect determination if on-line repair of said failed file system is possible;

computer readable program code devices configured to cause a computer to effect locking of said failed file system if said on-line repair is possible;

computer readable program code devices configured to cause a computer to effect said on-line repair of said failed file system; and computer readable program code devices configured to cause a computer to effect unlocking of said failed file system.

8. The computer program product of claim 7 wherein said computer readable program code devices configured to cause a computer to effect detection of an error further comprise:

computer readable program code devices configured to cause a computer to effect noting of an inconsistency in said failed file system;

computer readable program code devices configured to cause a computer to effect creating a failure record corresponding to said failed file system inconsistency; and computer readable program code devices configured to cause a computer to effect placing said failure record on an operating system lock thread.

9. The computer program product of claim 7 wherein said computer readable program code devices configured to cause a computer to effect locking further comprises:

computer readable program code devices configured to cause a computer to effect marking blocks of data associated with said failed file system as inaccessible on an associated computer mass storage device.

10. The computer program product of claim 7 further comprising:

computer readable program code devices configured to cause a computer to effect shutting down of said operating system in response to a determination that said on-line repair of said failed file system is not possible.

11. The computer program product of claim 7 further comprising:

computer readable program code devices configured to cause a computer to effect allowing other threads corresponding to other operating system file systems to continue while said failed file system is locked.

12. A computer including a computer operating system loadable thereon for running application programs, said operating system having a plurality of file systems incorporated therein accessible from said application programs, said operating system comprising:

a failed thread for indicating an error in a failed one of said plurality of file systems;

a lock thread started in response to said failed thread;

an error lock responsive to said lock thread for selectably locking said failed file system if on-line repair thereof is possible;

a block responsive to said error lock for inhibiting other threads from accessing said failed one of said plurality of file systems while on-line repair thereof is being effectuated whereby said block is removed in response to effectuation of said on-line repair of said failed file system.

13. The computer of claim 12 wherein said operating system comprises:

a user layer for interfacing said operating system to said application programs;

a kernel layer underlying said user layer; and a file system layer underlying said kernel layer and defining a file system interface therebetween.

14. The computer of claim 13 wherein said file system layer comprises a UNIX file system layer.

15. The computer of claim 13 wherein said file system interface comprises a VFS layer.

16. The computer of claim 12 wherein said block is implemented at said file system interface.

17. The computer of claim 12 further comprising:

a computer mass storage device associated with said computer for storing blocks of data associated with said plurality of file systems.

18. The computer of claim 17 wherein selected blocks of data on said computer mass storage device associated with said failed file system are marked as inaccessible in response to said lock thread.

\* \* \* \* \*